(12) United States Patent
Katayama et al.

(10) Patent No.: US 8,295,702 B2
(45) Date of Patent: Oct. 23, 2012

(54) OPTICAL MEDIA CONVERTER SYSTEM

(75) Inventors: Hitoshi Katayama, Shizuoka (JP); Yoshihiro Kakiuchi, Shizuoka (JP)

(73) Assignee: NEC Corporation, Tokyo (JP)

( * ) Notice: Subject to any disclaimer, the term of this patent is extended or adjusted under 35 U.S.C. 154(b) by 1638 days.

(21) Appl. No.: 11/082,874

(22) Filed: Mar. 18, 2005

(65) Prior Publication Data

US 2005/0207403 A1    Sep. 22, 2005

(30) Foreign Application Priority Data

Mar. 22, 2004    (JP) ................... 2004-082741

(51) Int. Cl.
   *H04J 14/00*    (2006.01)
(52) U.S. Cl. ................ 398/72; 398/58; 398/66
(58) Field of Classification Search .......... 398/58, 398/66, 70–72, 74, 100
   See application file for complete search history.

(56) References Cited

U.S. PATENT DOCUMENTS

| 2002/0063924 A1* | 5/2002 | Kimbrough et al. .......... 359/125 |
| 2003/0112965 A1* | 6/2003 | McNamara et al. ..... 379/399.01 |
| 2004/0213286 A1* | 10/2004 | Jette et al. ................ 370/466 |
| 2007/0115836 A1* | 5/2007 | Rees et al. ................ 370/242 |

FOREIGN PATENT DOCUMENTS

| JP | 11-341013 A | 12/1999 |
| JP | 2003-234853 A | 8/2003 |
| JP | 2003-318786 A | 11/2003 |

* cited by examiner

*Primary Examiner* — Dzung Tran
(74) *Attorney, Agent, or Firm* — Sughrue Mion, PLLC

(57) ABSTRACT

An optical media converter system is divided into an outdoor installed optical media converter and an indoor installed unit, which are connected to each other through an electrical Ethernet cable. The indoor installed unit includes two electrical Ethernet terminations and a power source section for supplying an electrical power from indoor to outdoor. The outdoor installed optical media converter includes an optical-electric converter, optical Ethernet termination, electrical Ethernet termination, and a power source section for generating a power source by an electrical power supplied from the indoor. With the above configuration, there can be provided an optical media converter system in which the need to draw the fiber-optic cable into a home can be eliminated, cost involved in a wiring work can be reduced, and a circuit design thereof is advantageous in cost reduction.

2 Claims, 5 Drawing Sheets

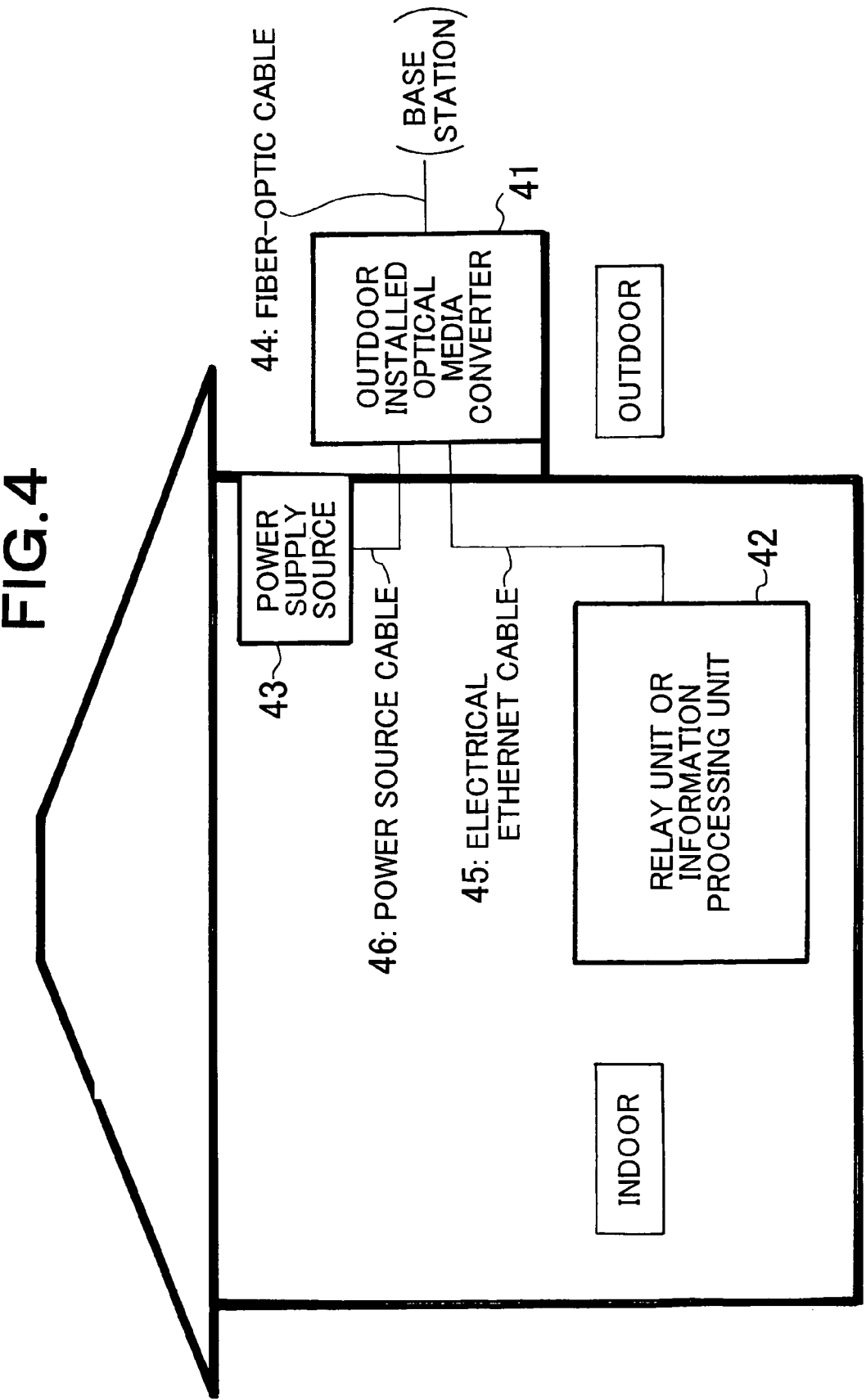

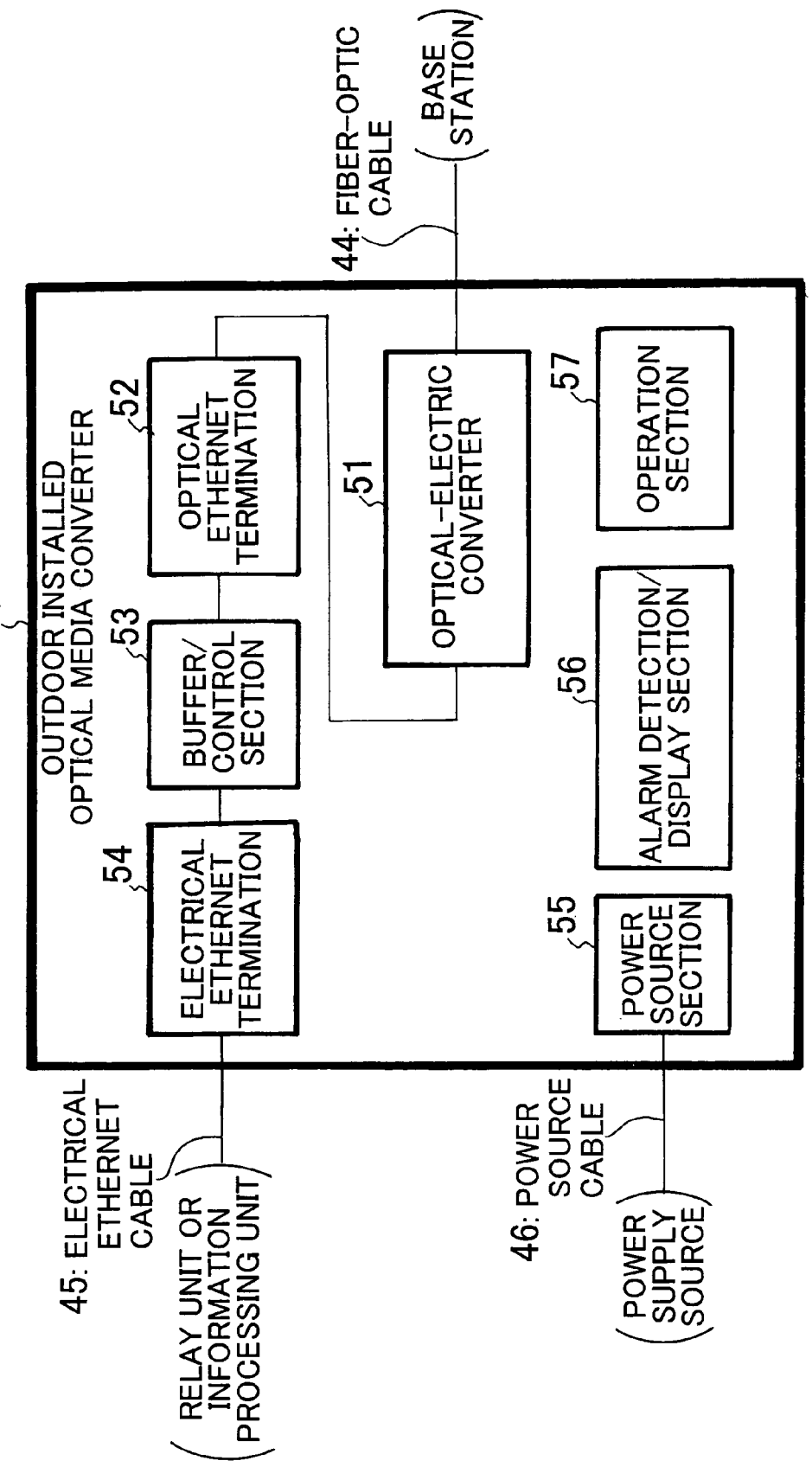

OPTICAL MEDIA CONVERTER SYSTEM

BACKGROUND OF THE INVENTION

1. Field of the Invention

The present invention relates to an optical media converter system that is connected to a fiber-optic cable serving as a transmission medium and performs data transmission by converting an optical signal into an electrical signal or converting the electrical signal into the optical signal, and more particularly, to an optical media converter system provided in a user's home for use in a communication network using a fiber-optic cable laid between a base station and the user's home.

2. Description of the Related Art

FIG. 3 shows an example of the entire configuration of a conventional optical media converter system provided in a user's home and connected to an optic-fiber cable. The optical media converter 31 shown in FIG. 3 is installed within the user's home. The optical media converter 31 is connected to a relay unit (router/computer or hub) or an information processing unit 32, which are installed indoors, through an electric Ethernet cable 35, connected to a power supply source 33 installed indoors through a power source cable 36, and connected to a counterpart device (not shown) in a base station through a fiber-optic cable 34 drawn from the outside into the house.

With the above configuration, the optical media converter 31 converts an electrical signal that has been sent from the relay unit or information processing unit 32 through the electric Ethernet cable 35 into an optical signal and transmits the optical signal to the base station through the fiber-optic cable 34. Further, the optical media converter 31 converts an optical signal that has been sent from the base station through the fiber-optic cable 34 into an electrical signal and transmits the electrical signal to the relay unit or information processing unit 32 through the electric Ethernet cable 35.

As disclosed in, for example, JP-A-2003-234853, in the optical media converter installed within the user's home, a power feeder is provided between the relay unit or information processing unit and the optical media converter to simplify wiring between the media converter and power supply.

There has been a problem relating to an installation of the conventional optical media converter. That is, it is necessary to draw a fiber-optic cable from the outside into the home. Accordingly, the fiber-optic cable may need to be bent to some extent for the cable laying. When the fiber-optic cable is bent in an angle more than a certain level for wiring, the level of a signal is attenuated. At worst, a disconnection takes place. Therefore, cost involved in a wiring work is high. Further, in some buildings, it was impossible to install the fiber-optic cable wiring due to its structural problem.

As a countermeasure, the optical media converter can be installed outside the user's home. The entire configuration of the optical media converter system in this case is shown in FIG. 4. In this case, the optical media converter installed outside of the user's home (hereinafter, referred to as "outdoor installed optical media converter") 41 is, as shown in FIG. 4, connected to a relay unit (router/computer or hub) or an information processing unit 42, which are installed indoors, through an electric Ethernet cable 45, connected to a power supply source 43 installed indoors through a power source cable 46, and connected to a counterpart device (not shown) in a base station through a fiber-optic cable 44.

With the above configuration, the outdoor installed optical media converter 41 converts an electrical signal that has been sent from the relay unit or information processing unit 42 through the electric Ethernet cable 45 into an optical signal and transmits the optical signal to the base station through the fiber-optic cable 44. Further, the outdoor installed optical media converter 41 converts an optical signal that has been sent from the base station through the fiber-optic cable 44 into an electrical signal and transmits the electrical signal to the relay unit or information processing unit 42 through the electric Ethernet cable 45.

FIG. 5 shows an example of the internal configuration of the outdoor installed optical media converter 41 of FIG. 4. As shown in FIG. 5, the outdoor installed optical media converter 41 includes an optical-electric converter 51, an optical Ethernet termination 52, a buffer/control section 53, and an electrical Ethernet termination 54 (all of the above are sequentially connected to each other between the fiber-optic cable 44 and electrical Ethernet cable 45), and a power source section 55 (connected to the power source cable 46), an alarm detection/display section 56, and an operation section 57.

To simplify wiring of the fiber-optic cable to be connected to the optical media converter as shown in FIG. 5, the optical media converter has needed to be installed outdoors as shown in FIG. 4. In the case of FIG. 4, however, all functions of the optical media converter are exposed to outdoor environment. Accordingly, the number of parts that must endure the outdoor environment is increased, resulting in high cost. Further, a large circuit scale makes it difficult to realize an environmental design or thermal design that meets the life-time requirement. Moreover, it is difficult to complete the wiring work in the case where the power supply cable is installed outdoors.

SUMMARY OF THE INVENTION

An object of the present invention is therefore to provide an optical media converter system in which the need to draw the fiber-optic cable into a home can be eliminated, cost involved in a wiring work can be reduced, and a circuit design thereof is advantageous in cost reduction.

To solve the above problem, according to an aspect of the present invention, there is provided an optical media converter system set in a user's home, and performing optical to electrical conversion, and data transmission by sending and receiving the optical signal and electrical signal between an fiber-optic cable and a communication unit disposed within the user's home. The system includes: an indoor installed unit set within the user's home and connected to the communication unit so as to allow them to communicate with each other; an outdoor installed optical media converter set outside of the user's home and connected to the fiber-optic cable; and an electrical Ethernet cable which connects the indoor installed unit and outdoor installed optical media converter so as to allow them to communicate with each other.

The indoor installed unit delivers an electrical signal transmitted from the communication unit to the electrical Ethernet cable, as well as transmitting an electrical signal transmitted through the electrical Ethernet cable to the communication unit.

The outdoor installed optical media converter converts an optical signal transmitted through the fiber-optic cable into an electrical signal and delivers the electrical signal to the electrical Ethernet cable, as well as converting an electrical signal transmitted through the electrical Ethernet cable into an optical signal and delivering the optical signal to the fiber-optic cable.

In the present invention, the indoor installed unit may include a first electrical Ethernet termination connected to the communication unit, and a second electrical Ethernet termination connected to the electrical Ethernet cable.

The indoor installed unit may include a power source section for supplying the outdoor installed optical media converter with an electrical power.

The indoor installed unit may include a buffer and control section between the first and second electrical Ethernet terminations.

The outdoor installed optical media converter may include: an optical-electric converter connected to the fiber-optic cable; an electrical Ethernet termination connected to the electrical Ethernet cable; and an optical Ethernet termination connected between the optical-electric converter and electrical Ethernet termination.

The outdoor installed optical media converter may include a power source section for generating a power source by an electrical power supplied from the indoor installed unit.

BRIEF DESCRIPTION OF THE DRAWINGS

In the accompanying drawings:

FIG. 4 shows an internal configuration of the optical media converter of FIG. 3; and FIG. 5 shows an entire configuration of an optical media converter installed outdoors.

DETAILED DESCRIPTION OF THE PREFERRED EMBODIMENTS

A preferred embodiment of the present invention will be described below with reference to the accompanying drawings.

Firstly, the outline of the embodiment of the present invention will be described. The optical media converter system according to the present invention is configured by adding some components to a conventional media converter. The components include: two electrical Ethernet terminations; a power source section for supplying an electrical power through an electrical Ethernet cable; and another power source section for generating a power source by an electrical power supplied through an electrical Ethernet cable.

More specifically, the optical media converter system according to the present embodiment is divided into an outdoor installed optical media converter and indoor installed unit, which are connected to each other by an electrical Ethernet cable. The outdoor installed optical media converter includes an optical-electric converter, an optical Ethernet termination, an electrical Ethernet termination, and a power source section that can receive electricity. The indoor installed unit includes two electrical Ethernet terminations, a buffer/control section, an operation/control section, an alarm detection/display section, and a power source section that can supply electricity.

The embodiment of the present invention will next be described in detail with reference to the drawings.

Figure 1:
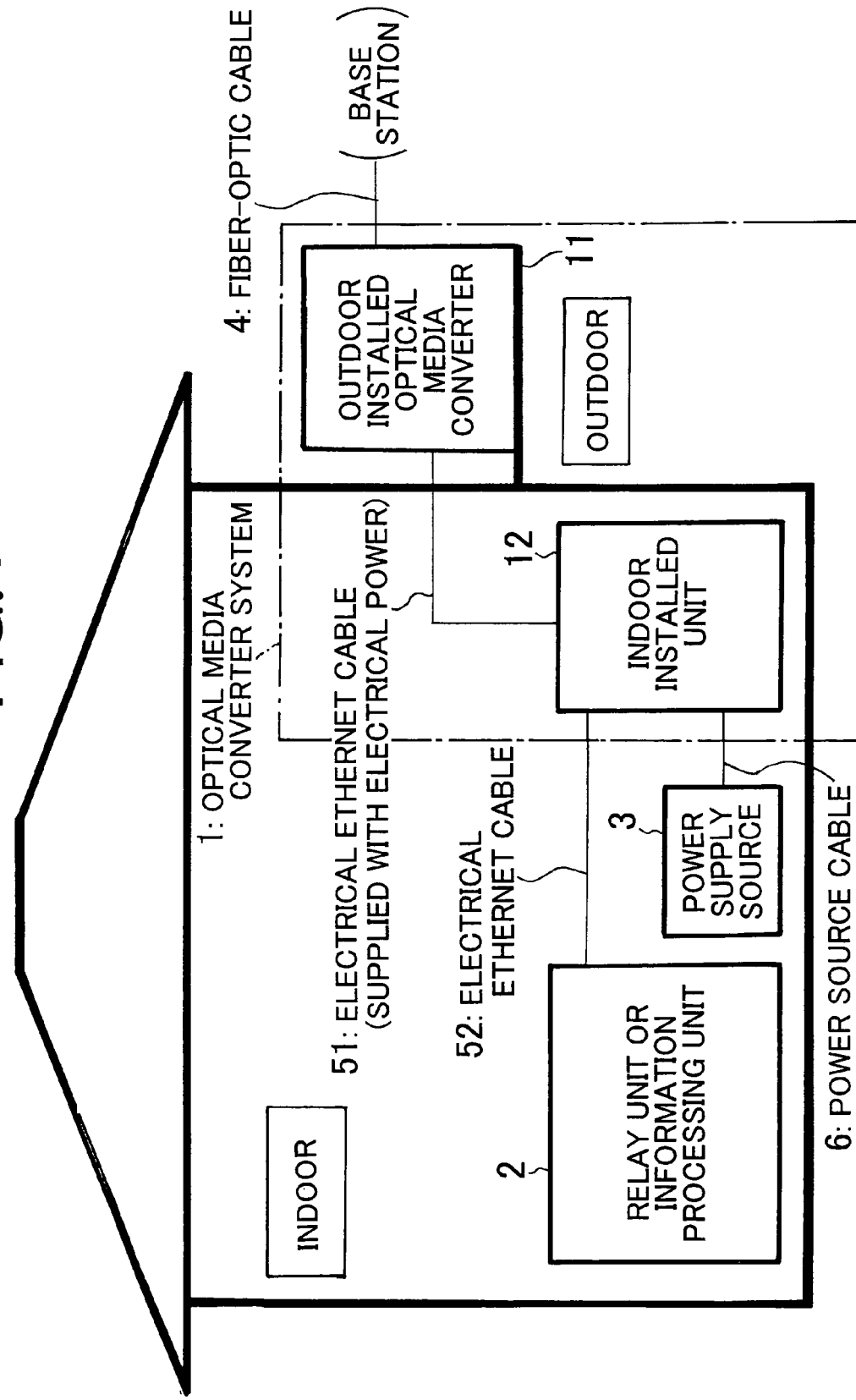
FIG. 1 shows an entire configuration of an optical media converter system according to an embodiment of the present invention.

FIG. 1 shows an entire configuration of the optical media converter system according to the embodiment of the present invention.

The optical media converter system 1 shown in FIG. 1 includes an optical media converter 11 installed outside a user's home (hereinafter referred to as "outdoor installed optical media converter"), a unit 12 provided within the user's home (hereinafter referred to as "indoor installed unit"), which are connected to each other by an electrical Ethernet cable 51.

Connected to the outdoor installed optical media converter 11 is one end of a fiber-optic cable 4. The other end of the fiber-optic cable 4 is connected to a counterpart device (not shown) provided in a base station. Connected to the indoor installed unit 12 is one end of an electrical Ethernet cable 52 and one end of a power source cable 6. The other end of the electrical Ethernet cable 52 is connected to a relay unit (router/computer or hub) or an information processing unit (communication unit) 2. The other end of the power source cable 6 is connected to a power supply source 3.

As described above, the optical media converter system 1 is divided into two functional blocks: the outdoor installed optical media converter 11 and indoor installed unit 12. Accordingly, all functions of the optical media converter need not be installed outside of the user's home. Therefore, the scale of the circuit integrated into the outdoor installed optical media converter 11 can be reduced as compared to the conventional outdoor installed optical media converter 41 shown in FIG. 4.

Figure 2:
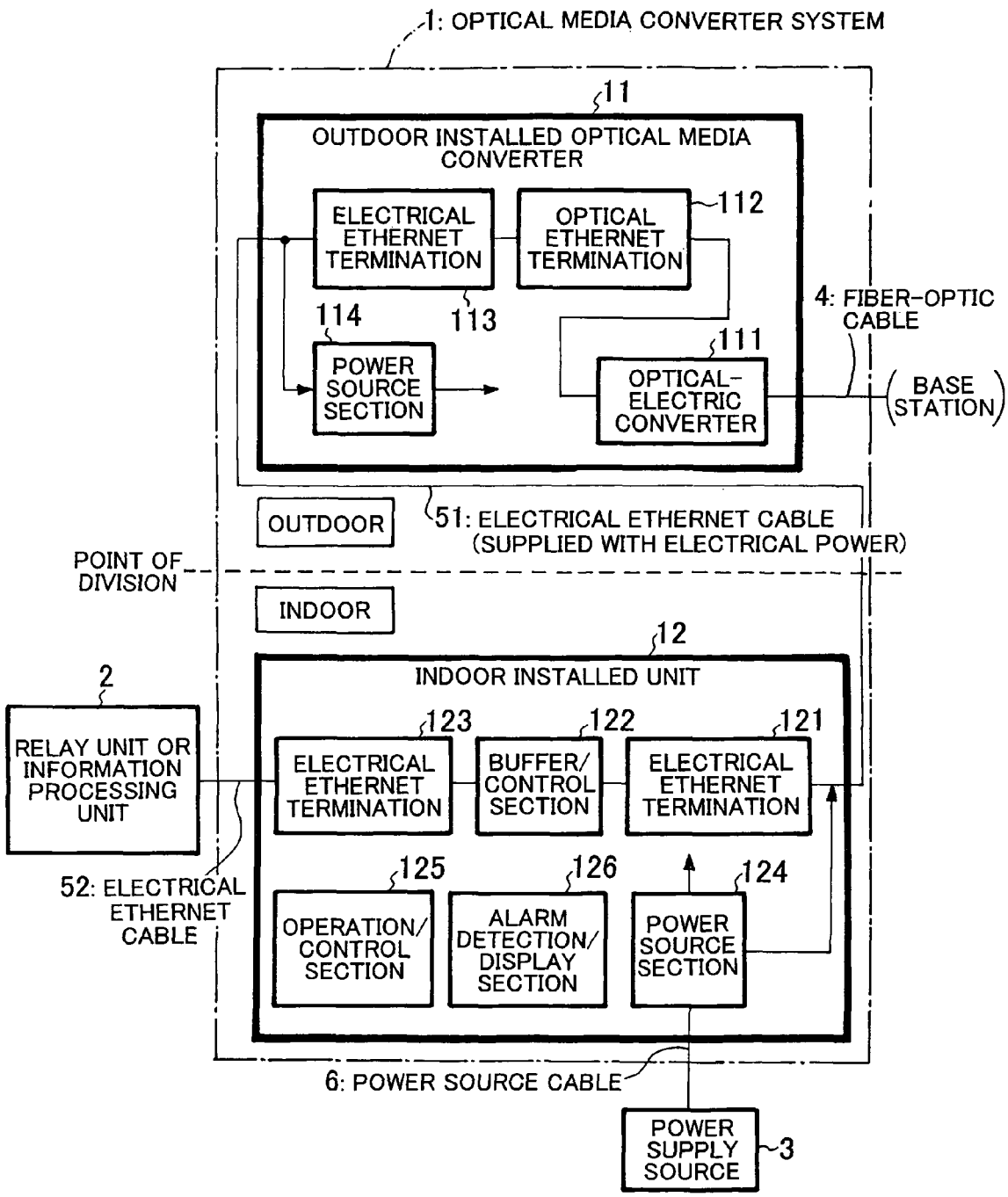
FIG. 2 shows internal configurations of an outdoor installed optical media converter and an indoor installed unit.
Figure 3:
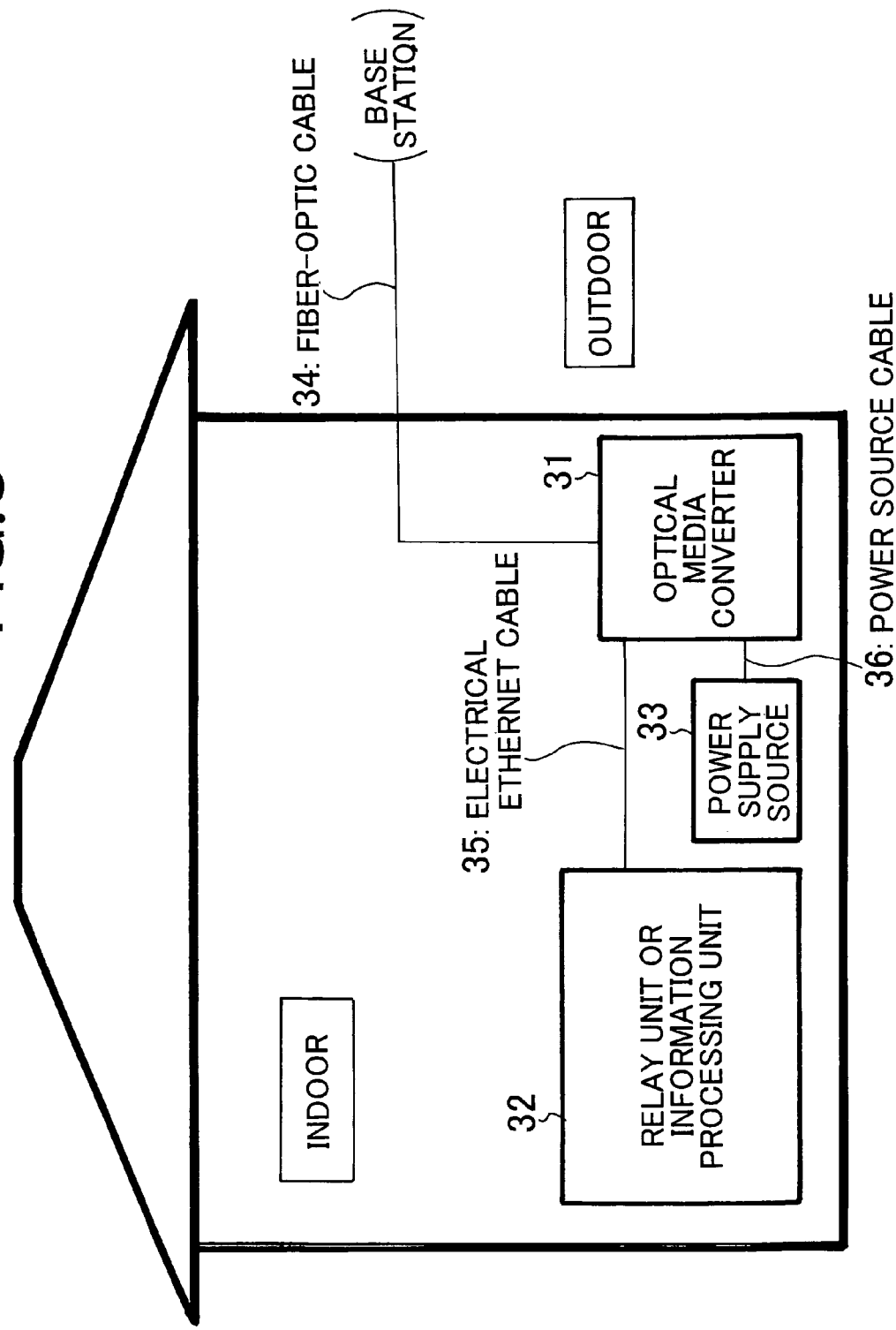
FIG. 3 shows an entire configuration of a conventional optical media converter provided in a user's home.

FIG. 2 shows an example of the internal configurations of the outdoor installed optical media converter 11 and indoor installed unit 12.

As shown in FIG. 2, the outdoor installed optical media converter 11 includes, in view of functionality, an optical-electric converter 111, an electrical Ethernet termination 113, a power source section 114, and an optical Ethernet termination 112. The optical-electric converter 111 is connected to one end of the fiber-optic cable 4. The electrical Ethernet termination 113 and power source section 114 are connected to one end of the electrical Ethernet cable 51, respectively. The optical Ethernet termination 112 is connected to the electrical Ethernet termination 113 and optical-electric converter 111.

The electrical Ethernet termination 113 electrically communicates with the indoor installed unit 12 through the electrical Ethernet cable 51.

The optical-electric converter 111 converts an optical signal into an electrical signal or converts an electrical signal into an optical signal and thereby communicates with a counterpart device provided in a base station through the fiber-optic cable 4.

The optical Ethernet termination 112 converts the format of signals transmitting and receiving between the electrical Ethernet termination 113 and optical-electric converter 111.

The power source section 114 converts the electrical power supplied through the electrical Ethernet cable 51 into a voltage used in the unit.

The indoor installed unit 12 functionally includes, as shown in FIG. 2, an electrical Ethernet termination (second electrical Ethernet termination) 121, a power source section 124, an electrical Ethernet termination (first electrical Ethernet termination) 123, a buffer/control section 122, an operation/control section 125, and an alarm detection/display section 126. The electric Ethernet termination 121 and power source section 124 are connected to the other end of the electrical Ethernet cable 51, respectively. The electrical Ethernet termination 123 is connected to one end of the electrical Ethernet cable 52. The buffer/control section 122 is connected to the electric Ethernet terminations 121 and 123. A power supply source 3 is connected to the power source section 124 through the power source cable 6.

The electrical Ethernet termination 121 electrically communicates with the outdoor installed optical media converter 11 through the electrical Ethernet cable 51.

The electrical Ethernet termination 123 electrically communicates with the relay unit or information processing unit 2 connected to the indoor installed unit 12 through the electrical Ethernet cable 52.

The buffer/control section 122 performs signal processing such as changing data rate or switching clocks in accordance to data type between the electrical Ethernet terminations 121 and 123.

The operation/control section 125 performs system settings, various controls, and the like.

The alarm detection/display section 126 detects system state such as the state of the outdoor installed optical media converter 11, the counterpart device connected to the outdoor installed optical media converter 11 through the fiber-optic cable 4 or indoor installed unit 12, and displays it to the user.

The power source section 124 converts the electrical power supplied from the power supply source 3 through the power source cable 6 into a voltage used in the indoor installed unit 12 and supplies the outdoor installed optical media converter 11 with the electrical power through the electrical Ethernet cable 51.

The power supply method of FIG. 2 using the electrical Ethernet terminations 113, 121, and 123, optical Ethernet termination 112, optical-electric converter 111, electrical Ethernet cable 51 is well known to those skilled in the art and does not relate directly to the present invention. Thus, detailed description thereof will be omitted.

As compared to the above-described conventional art, the optical media converter system 1 is configured by diving the conventional outdoor installed optical media converter 41 shown in FIG. 5 with the dividing point set in between the optical Ethernet termination 52 and buffer/control section 53 and by adding the electrical Ethernet terminations 113 and 121 to each diving point, as shown in FIG. 2. The optical media converter system 1 additionally includes the power source section 124 for supplying an electrical power from indoor to outdoor through the electrical Ethernet cable 51 and the power source section 14 for generating a power source by the supplied electrical power.

As described above, the optical media converter system 1 is configured by connecting the indoor unit and outdoor converter with each other through the electrical Ethernet cable 51. Therefore, it is possible to reduce the size of the outdoor installed optical media converter 11 and to facilitate the installation and wiring work.

An entire operation of the embodiment will next be described below.

Referring to FIGS. 1 and 2, the optical media converter system 1 converts an electrical signal transmitted from or received by the relay unit or information processing unit 2 provided in the user's home into an optical signal and performs communication with the counterpart device provided on the base station side and connected to the fiber-optic cable 4.

When data has been transmitted from the relay unit or information processing unit 2, the indoor installed unit 12 performs the following processes.

The electrical Ethernet termination 123 receives the electrical signal sent from the relay unit or information processing unit 2 through the electrical Ethernet cable 52. The received electrical signal is subjected to signal processing such as speed conversion or clock switching by the buffer/control section 122. The processed electrical signal is delivered to the electrical Ethernet cable 51 by the electrical Ethernet termination 121. The signal is then transmitted to the outdoor installed optical media converter 11 through the electrical Ethernet cable 51.

Subsequently, the outdoor installed optical media converter 11 performs the following processes.

The electrical Ethernet termination 113 receives the electrical signal that the electrical Ethernet termination 13 on the indoor installed unit 12 side has transmitted through the electrical Ethernet cable 51. The received electrical signal is subjected to format conversion by the optical Ethernet termination 112. The format-converted electrical signal is then converted into an optical signal by the optical-electric converter 111 and is delivered to the fiber-optic cable 4. The signal is then transmitted to the base station through the fiber-optic cable 4.

When data has been received by the relay unit or information processing unit 2, the outdoor installed optical media converter 11 performs the following processes.

The optical-electrical converter 111 converts an optical signal that has been transmitted from the counterpart device on the base station side through the fiber-optic cable 4 into an electrical signal. The converted electrical signal is subjected to format conversion by the optical Ethernet termination 112. The format-converted electrical signal is delivered to the electrical Ethernet cable 51 by the electrical Ethernet termination 113 and then transmitted to the indoor installed unit 12 through the electrical Ethernet cable 51.

Subsequently, the indoor installed unit 12 performs the following processes.

The electrical Ethernet termination 121 receives the electrical signal transmitted from the outdoor installed optical media converter 11 through the electrical Ethernet cable 51. The received electrical signal is then subjected to signal processing such as speed conversion or clock switching by the buffer/control section 122. The processed electrical signal is delivered to the electrical Ethernet cable 52 by the electrical Ethernet termination 123 and then transmitted to the relay unit or information processing unit 2 through the electrical Ethernet cable 52.

Thus, according to the embodiment, the indoor installed unit and the outdoor installed optical media converter are connected to each other using the electrical Ethernet cable, enabling the downsizing of the circuit configuration in the outdoor installed optical media converter. Therefore, it is possible to reduce the size of the outdoor installed optical media converter, making it easy to determine the installation location. Further, power consumption of the outdoor installed optical media converter can be reduced, contributing to life elongation of the outdoor installed optical media converter. Moreover, it is possible to reduce the number of parts that must endure the outdoor environment, leading to cost reduction of the entire system.

Further, the electrical Ethernet cable is used to supply the outdoor installed optical media converter with an electrical power. With this configuration, the outdoor installed optical media converter terminates the optical interface and allows the electrical Ethernet cable to be drawn into the indoor, facilitating the wire work. Further, the power source cable need not be installed in the outdoor installed optical media converter, facilitating the installation.

While the indoor installed unit 12 includes the operation/control section 125, alarm detection/display section 126, and buffer/control section 122 in the embodiment described above, these components 125, 126, and 122 may be omitted. Further, the outdoor installed optical media converter 11 may include the buffer/control section between the electrical Ethernet termination 113 and optical Ethernet termination 112.

Moreover, the outdoor installed optical media converter 11 may include the operation/control section, alarm detection/display section.

What is claimed is:

1. An optical media converter system comprising:
    an indoor installed unit; and
    an outdoor installed optical media converter,
    wherein the optical media converter system is divided into the indoor installed unit and the outdoor installed optical media converter, which are connected to each other through an electrical Ethernet cable,
    the indoor installed unit comprises two electrical Ethernet terminations, a first power source section for supplying electrical power from indoor to outdoor, a buffer and control section between the two electrical Ethernet terminations, an operation and control section, and an alarm detection and display section, and
    the outdoor installed optical media converter comprises an optical-electric converter, an electrical Ethernet termination connected to the electrical Ethernet cable, an optical Ethernet termination between the optical-electric converter and the electrical Ethernet termination, and a second power source section for generating a power source by the electrical power supplied from the indoor.

2. The optical media converter system according to claim 1, wherein the first power source section supplies electric power to the second power source section through the electrical Ethernet cable.

* * * * *